US006231912B1

(12) United States Patent
Widder et al.

(10) Patent No.: US 6,231,912 B1
(45) Date of Patent: May 15, 2001

(54) ORGANOLEPTIC SUBSTANCES

(75) Inventors: Sabine Widder, Holzminden; Christopher Sabater-Lüntzel, Höxter-Ottbergen; Jürgen Vollhardt, Holzminden; Thomas Dittner, Kirchbrak; Wilhelm Pickenhagen, Höxter, all of (DE)

(73) Assignee: Dragoco Gerberding & Co. KG (DE)

( * ) Notice: Subject to any disclaimer, the term of this patent is extended or adjusted under 35 U.S.C. 154(b) by 0 days.

(21) Appl. No.: 09/217,493

(22) Filed: Dec. 21, 1998

(30) Foreign Application Priority Data

Dec. 19, 1997 (DE) .............................................. 197 56 789
Aug. 20, 1998 (EP) .............................................. 98115661

(51) Int. Cl.[7] ........................................................ A23L 1/22

(52) U.S. Cl. .......................... 426/535; 426/534; 426/650; 510/101

(58) Field of Search .................................... 426/535, 534, 426/650; 510/101; 560/706

(56) References Cited

FOREIGN PATENT DOCUMENTS 1491269 11/1977 (GB) .

OTHER PUBLICATIONS

Pihlaja et al., 1980:58054 HCAPLUS, abstracting Org. Magn. Reson. (1979), 12(5), 331–6.*

Pihlaja, et al., "Conformational Analysis; XIX Properties and Reaction of 1,3–Oxathienes VIII A H NMR Conformational Study of Methyl–Substituted Derivaties", Organic Magnetic Resonance, vol. 12, No. 5, 1979.

* cited by examiner

*Primary Examiner*—Leslie Wong
(74) *Attorney, Agent, or Firm*—Pendorf & Cutliff

(57) ABSTRACT

There is described 3-mercapto-2-alkyl-alkane-1-ols of the general formula A,

A

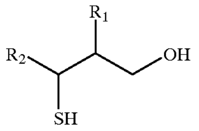

wherein $R_1$=$CH_3$, $C_2H_5$, $C_3H_7$ (n, iso) or $C_4H_9$ (n, iso, tert.) and $R_2$=$CH_3$, $C_2H_5$, $C_3H_7$ (n, iso) or $C_4H_9$ (n, iso, tert.), which can be employed as fragrance or organoleptic substances. For production of these compounds, either the corresponding 3-acetylthio-2-alkyl-alkanal or the 3-mercapto-2-alkyl-alkanal can be converted with a reducing agent. Described is also a process for organoleptically enhacing a foodstuff with an alkanol of the general Formula A, wherein an ester of the alkanol is added to the foodstuff and the ester fortified foodstuff is subjected to a process, in which the ester is at least partially converted to the alkanol.

16 Claims, 18 Drawing Sheets

Production of 3-Acetylthio-2-methyl-pentanal

Production of 3-Mercapto-2-methyl-pentan-1-ol

Fig.3
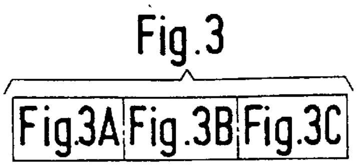
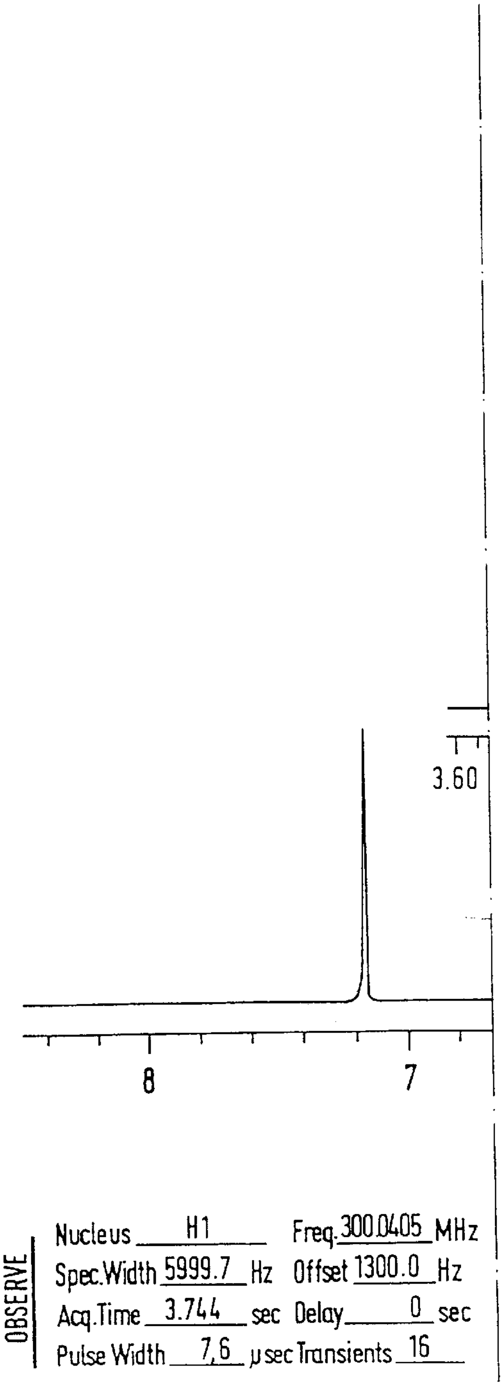
Fig.3A

2 Diastereomer (rac.)

File : C:\HPCHEM\1\DATA\747KREFE.D
Operator :
Acquired : 16 Dec 97 4:45 pm using AcqMethod WAXSL
Instrument : GCD
Sample Name: 2-methyl-3-mercapto-pentanol
Misc Info : KAS 60-12-240(5); Li67,02; 0,5µl/sl
Vial Number: 1

File : C:\HPCHEM\1\DATA\747KREFE.D
Operator :
Acquired : 16 Dec 97 4:45 pm using AcqMethod WAXSL
Instrument : GCD
Sample Name: 2-methyl-3-mercapto-pentanol
Misc Info : KAS 60-12-240(5); Li67,02; 0,5µl/sl
Vial Number: 1

Area Percent Report -- Sorted by Signal

```
Information from Data File:
File        : C:\HPCHEM\1\DATA\747KREFE.D
Operator    :
Acquired    : 16 Dec 97   4:45 pm using AcqMethod WAXSL
Sample Name: 2-methyl-3-mercapto-pentanol
Misc Info   : KAS 60-12-240(5); Li67,02; 0,5µl/sl
Vial Number: 1
CurrentMeth: C:\HPCHEM\1\METHODS\WAXSL.M
```

| Retention Time | Area | Area % | Ratio % | Type | Width |
|---|---|---|---|---|---|
| Total Ion Chromatogram | | | | | |
| 26.154 | 30569104 | 48.149 | 92.861 | rBV | 0.206 |
| 26.344 | 32919150 | 51.851 | 100.000 | rVB | 0.387 |

(2R,3S)-Enantiomer (S)-phenylalanine (2R, 3R)

(2S, 3S)

(2R, 3S)

(2S, 3R)

Acquired : 16 Jun 98 12:04 pm using AcqMethod WAXSL
Instrument : GCD
Sample Name : 3-Mercapto-2-methyl-pentanal
Misc Info : KAS 60-12-240(5); Li 67,02; 0,5µl/sl
Vial number : 1

Acquired : 16 Jun 98 12:04 pm using AcqMethod WAXSL
Instrument : GCO
Sample Name : 3-Mercapto-2-methyl-pentanal
Misc Info : KAS 60-12-240(5); Li 67,02; 0,5µl/sl
Vial number : 1

(a)

(b)

ORGANOLEPTIC SUBSTANCES

BACKGROUND OF THE INVENTION

1. Field of the Invention

The invention concerns a new fragrance and flavor substance (organoleptic substance), as well as a process for production of this new substance.

2. Description of the Related Art

It is conventional nowadays to aromatize and flavor enhance consumables. The majority of the consumer base in the modern industrial society expects a broad pallet of tasteful consumables at reasonable prices. The tastefulness of consumables is of great importance, since as a rule this is responsible for a good acceptance. The aroma industry makes available a large number of aromatic/flavoring substances, in order to make consumables available and appetizing to a broad segment of the population.

Fragrance or flavor substances are employed, in order (a) to impart a flavor or taste note to consumables or foodstuffs which do not have their own flavor or taste or (b) to compensate for fragrance or flavor losses, which may occur for example in the process of producing a foodstuff.

SUMMARY OF THE INVENTION

The present invention is concerned with the task, of providing a substance for enhancing the fragrance or flavor of foodstuffs (in the following simply referred to as "organoleptic substances")

In accordance with the invention there are provided the 3-mercapto-2-alkyl-alkane-1-ol of the general formula A

A

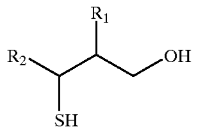

wherein $R_1=CH_3$, $C_2H_5$, $C_3H_7$ (n, iso) or $C_4H_9$ (n, iso, tert.) and $R_2=CH_3$, $C_2H_5$, $C_3H_7$ (n, iso) or $C_4H_9$ (n, iso, tert.)

as organoleptic substances. Surprisingly it has been found, that these newly synthesized compounds are superbly suited for imparting to foodstuffs (in particular meat broth and other meat dishes) an interesting olfactory and taste note. On the basis of the very high olfactory and taste intensity of the inventive compounds these can be employed in great dilution; the precise concentration or amount for enhancing the fragrance or flavor of a foodstuff will be determined by the technician in the conventional manner on the basis of the respective desires and requirements for particular cases.

The inventive compounds are beyond this also suitable for employment as fragrance substances, and more specifically as fragrances in the perfume industry; they generally have an extremely low olfactory threshold value, which proves itself to be advantageous, since even small amounts of the inventive compounds are sufficient for producing the desired odor.

The inventive compounds have in common the following structural characteristics, which surprisingly produce only by their simultaneous presence in a single molecule the desired smell and taste characteristics:

an alcohol functionality at C-1 a mercapto-group (SH-group) at C-3 a tertiary C-2

The invention concerns besides the inventive compounds also processes for their production.

BRIEF DESCRIPTION OF THE DRAWINGS

For a fuller understanding of the nature and objects of the present invention reference should be made by the following detailed description taken in with the accompanying drawings in which.

DETAILED DESCRIPTION OF THE INVENTION

Figure 1:
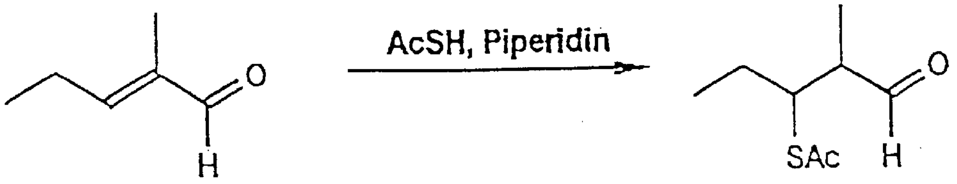
FIG. 1 schematically represents the production of 3-acetylthio-2-methyl-pentanal according to Example 1.

In the inventive process for production of a 3-mercapto-2-alkyl-alkanol of the Formula A wherein $R_1=CH_3$, $C_2H_5$, $C_3H_7$ (n, iso) or $C_4H_9$ (n, iso, tert.) and $R_2=CH_3$, $C_3H.$, $C_3H_7$ (n, iso) or $C_4H_9$ (n, iso, tert.) the corresponding 3-acetylthio-2-alkyl-alkanal is converted with a reducing agent such as lithium aluminum hydride or diisobutyl aluminum hydride.

This process is particularly suitable for production of the 3-mercapto-2-methyl-pentane-1-ol (compound of Formula A wherein $R_1=CH_3$ and $R_2=C_2H_5$). Herein 3-acetylthio-2-methyl-pentanal is converted with a reducing agent such as lithium aluminum hydride or diisobutyl aluminum hydride.

In an alternative process for production of a 3-mercapto-2-alkyl-alkanol of Formula A wherein $R_1=CH_3$, $C_2H_5$, $C_3H_5$ (n, iso) or $C_4H_9$ (n, iso, tert.) and $R_2=CH_3$, $C_2H_5$, $C_3H_7$ (n, iso) or $C_4H_9$ (n, iso, tert.) the corresponding 3-mercapto-2-alkyl-alkanal is converted with a reducing agent such as sodium borohydride, lithium aluminum hydride or diisobutyl aluminum hydride.

This process is also in particular suitable for production of the 3-mercapto-2-methyl-pentane-1-ol.

The enantiomers of the 3-mercapto-2-methyl-pentane-1-ol and the other alkanols according to the invention can be produced by way of an enantiomer pure synthesis, which in the following will be described in greater detail.

According to the preferred field of use of the inventive compound the invention also encompasses the fragrance or flavor compound formulations, which include at least one inventive compound.

And finally the invention concerns also organoleptically enhanced foodstuffs including one or more inventive compounds as well as the employment of the inventive compounds as fragrance or organoleptic substances.

The inventive alkanols are sensorially particularly interesting. In place of their direct employment as fragrance or organoleptic substances it may however sometimes be desired, to employ chemical derivatives, which allow themselves to be easily converted to the respective alkanol. The derivatives can themselves be sensorially interesting, but this is not necessarily the case. In particular it is possible to add to a foodstuff in the place of an inventive alkanol the corresponding ester (for example the corresponding acetate, propionate, butyrate, etc.). This makes sense particularly in the case when during the further processing of the foodstuff a hydrolysis of ester to the sensorially active alkanol occurs.

A typical example of this is the treatment of meats, which are in a conventional manner intended for cooking, frying or grilling, with the ester (for example the acetate) of an inventive alkanol. During the cooking, frying or grilling process there occurs as a rule a (at least partial) hydrolysis of the ester to the inventive alkanol, which then assumes the actual organoleptic function. According to a further typical example the production of the alkanol from the corresponding ester already occurs industrially, and this as a result of the conventional processes of the industrial treatment of foodstuffs with reaction aromas.

An object of the invention is accordingly also a process for organoleptically enhancing a foodstuff with an inventive alkanol, wherein the foodstuff is enhanced or supplemented with an ester of the alkanol and the foodstuff so enhanced with the ester is subjected to a process, wherein the ester is at least partially converted to the alkanol.

The concept "ester of the alkanol" encompasses therein also the 3-acylthioester of an inventive alkan-1-ol. These can be obtained for example by substitution or conversion of the inventive alkan-1-ol with a carboxylic acid chloride (for example acetic acid chloride or propionic acid chloride).

In the following the invention will be explained in greater detail using examples:

In the following Examples, the terms in brackets after the reagents, [623-36-9] etc., are the Chemical Abstract numbers of the respective reagents.

The immediately following Examples 1 and 2 together form a production protocol for the inventive group of the 3-mercapto-2-alkyl-alkane-1-ol using for the example the 3-mercapto-2-methyl-pentane-1-ol, wherein in a first step (Example 1) 3-acetylthio-2-methyl-pentanal is produced.

EXAMPLE 1

Production of 3-acetylthio-2-methyl-pentanal

Reagents:
2-Methyl-2-pentenal [623-36-9]
Thioacetic acid [507-09-5]
Piperidine [110-89-4]

In a 50 ml stirring apparatus with internal thermometer under nitrogen atmosphere at 10° C. 0.14 g piperidine is added to 13.47 g 2-methyl-2-pentenal. Thereafter slowly 15.73 g thioacetic acid is added drop wise with stirring at 10° C. (ice/water-cooling). After the addition one allows the reaction to be further stirred for 18 hours at room temperature. Subsequently, one dilutes the reaction mixture with 100 ml diethylether. The organic phase is sequentially washed one time with 20 ml 1N hydrochloric acid and 2 times with respectively 20 ml saturated sodium hydrogen carbonate solution. After drying the organic phase over sodium sulfate, the solvent is drawn off using a rotary evaporator. One obtains 16.8 g of an almost colorless fluid. GC-MS-analysis of the raw product shows an 82% purity of the desired product (diasteriomeric relationship 49:51). The inventive raw product is employed in the subsequent reaction according to Example 2 without further purification.

The production of 3-acetylthio-2-methyl-pentanal according to Example 1 is schematically represented in the attached FIG. 1.

EXAMPLE 2

Production of 3-mercapto-2-methyl-pentane-1-ol

Reagents:
Lithium aluminum hydride
3-Acetylthio-2-methyl-pentanal

In a dry 500 ml string apparatus with internal thermometer one adds under nitrogen atmosphere 100 ml dry diethylether to 3.6 g lithium aluminum hydride and cools then to −5° C. (ice/common salt mixture). With stirring one slowly adds drop wise 15 g 3-acetylthio-2-methyl-pentanal (raw product from the first step), so that an internal temperature of 5° C. is not exceeded. After the drop wise addition one allows stirring to continue for a further half hour at room temperature. One then cools again to 0° C. and hydrolyzes very carefully first with a saturated ammonium chloride solution, then with 2N hydrochloric acid. One separates the organic phase and extracts the aqueous phase one time with 100 ml diethylether. The combined organic phases are washed twice with respectively 20 ml saturated sodium hydrogen carbonate solution. After drying the organic phase over sodium sulfate the solvent is drawn off using a rotation evaporator. The raw product is distilled in vacuum (boiling temperature 46–49° C./1–2 mbar). One thus obtains 5.6 g (30% yield from the second step according to Example 1 and 2) 3-mercapto-2-methyl-pentane-1-ol (diasteriomeric mixture) as clear fluid of intense aroma.

Figure 2:
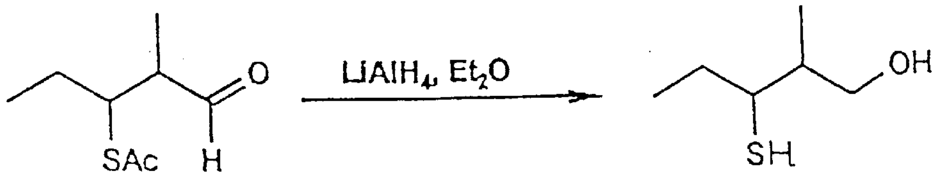
FIG. 2 schematically represents the production of 3-mercapto-2-methyl-pentane-1-ol according to Example 2.
Figure 3B:
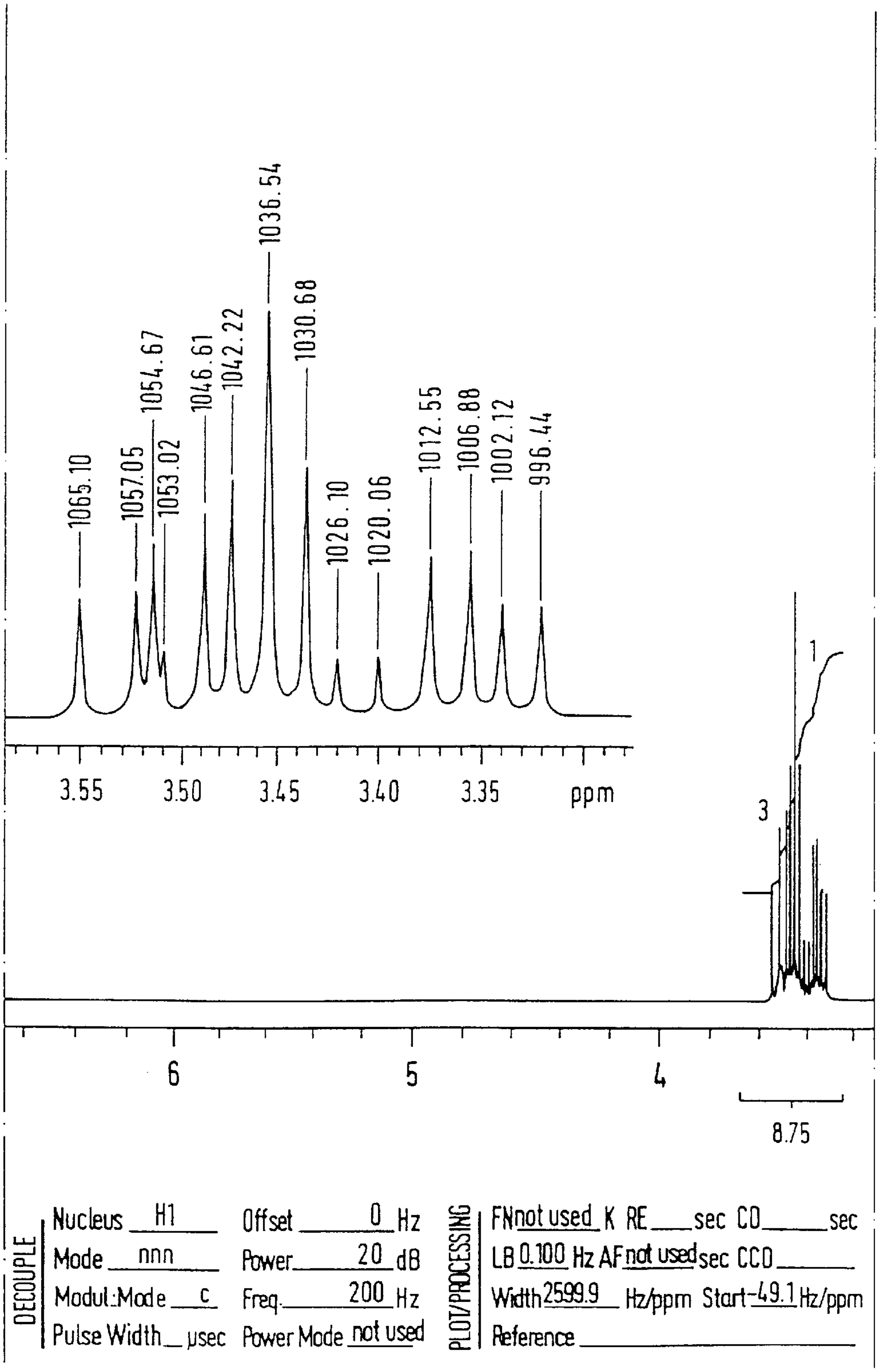
FIGS. 3–6 show spectroscopic data produced for the inventive substance 3-mercapto-2-methyl-pentane-1-ol.
Figure 3C:
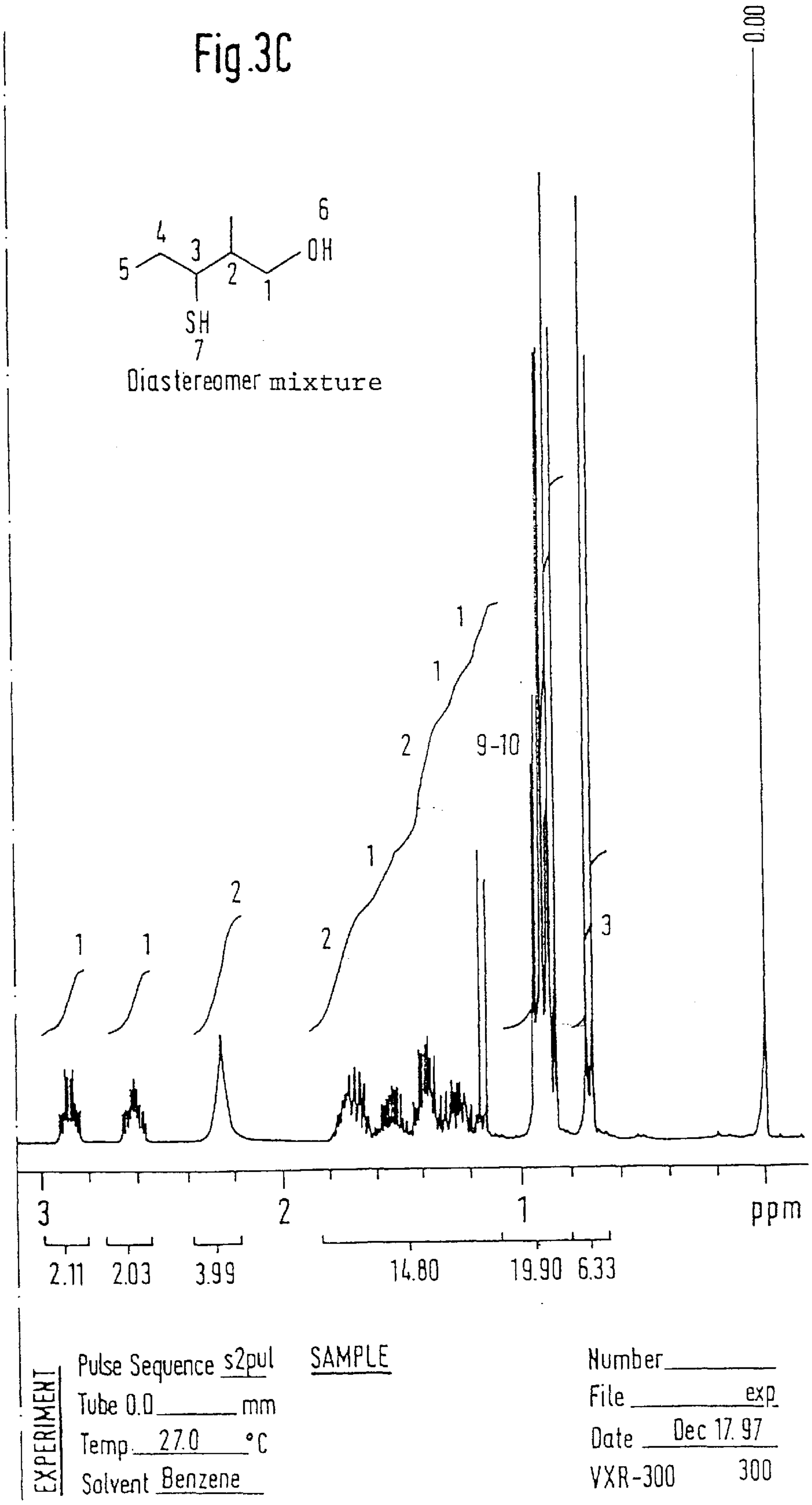
Figure 4:
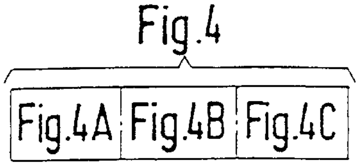
Figure 4A:
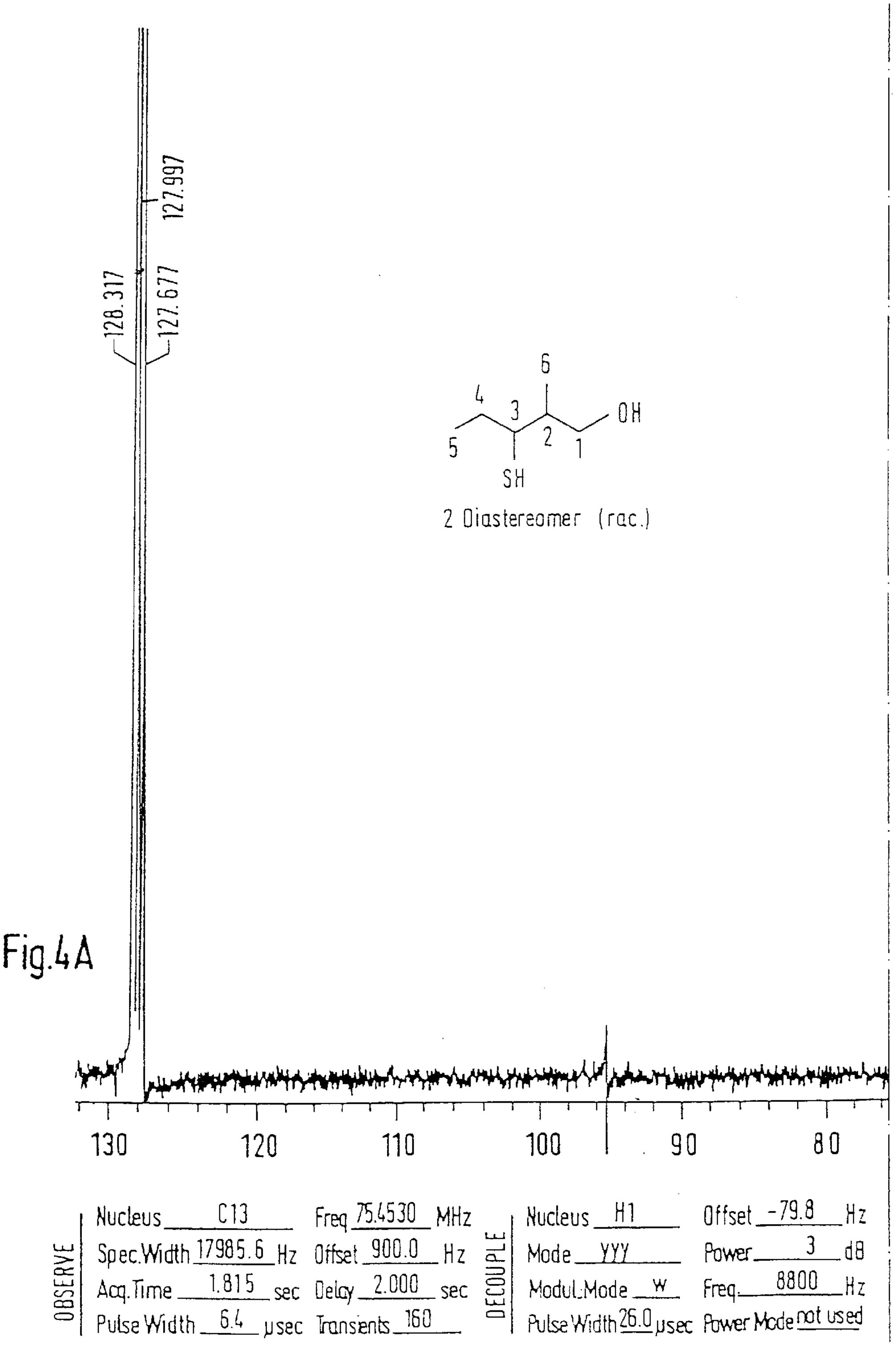
Figure 4B:
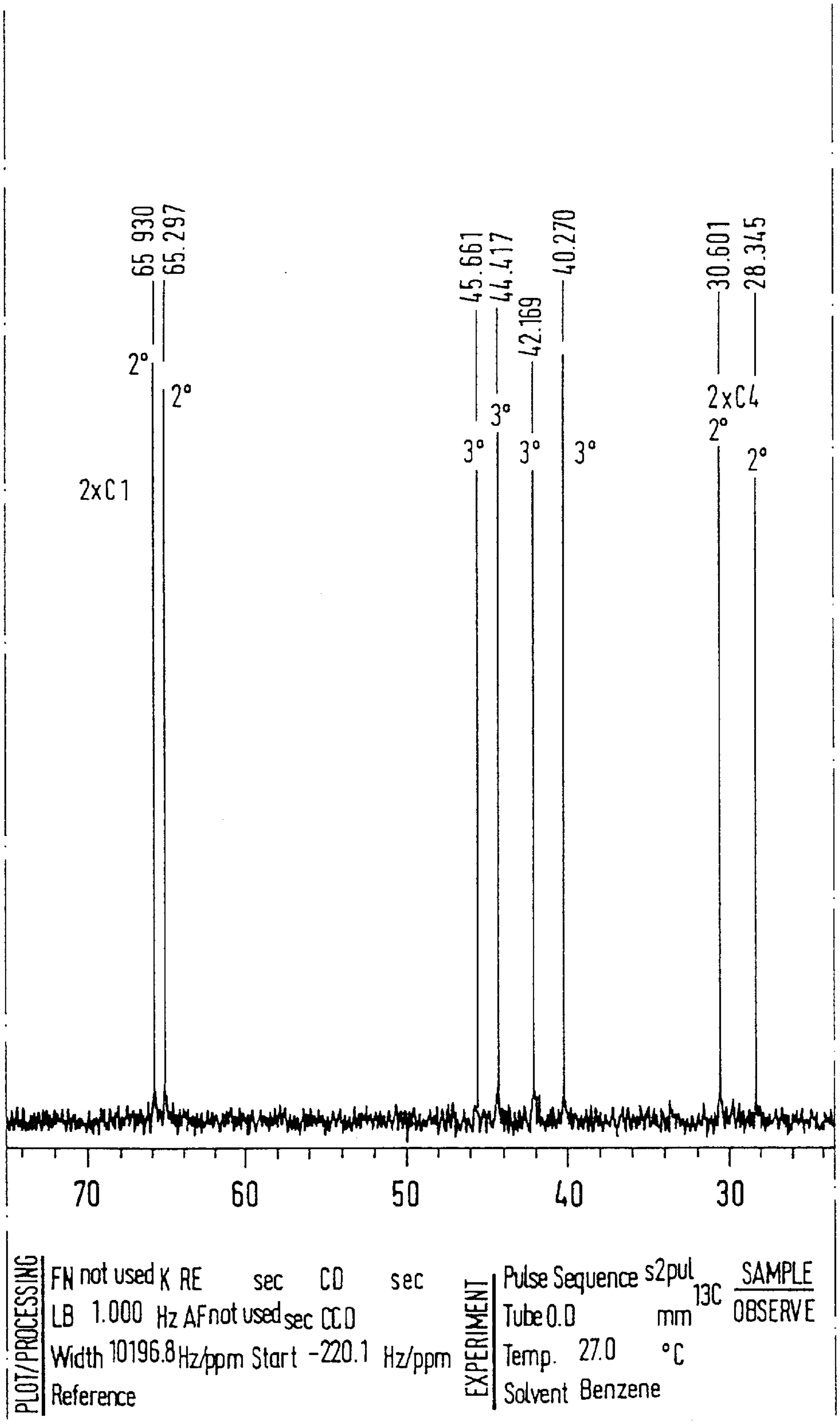
Figure 4C:
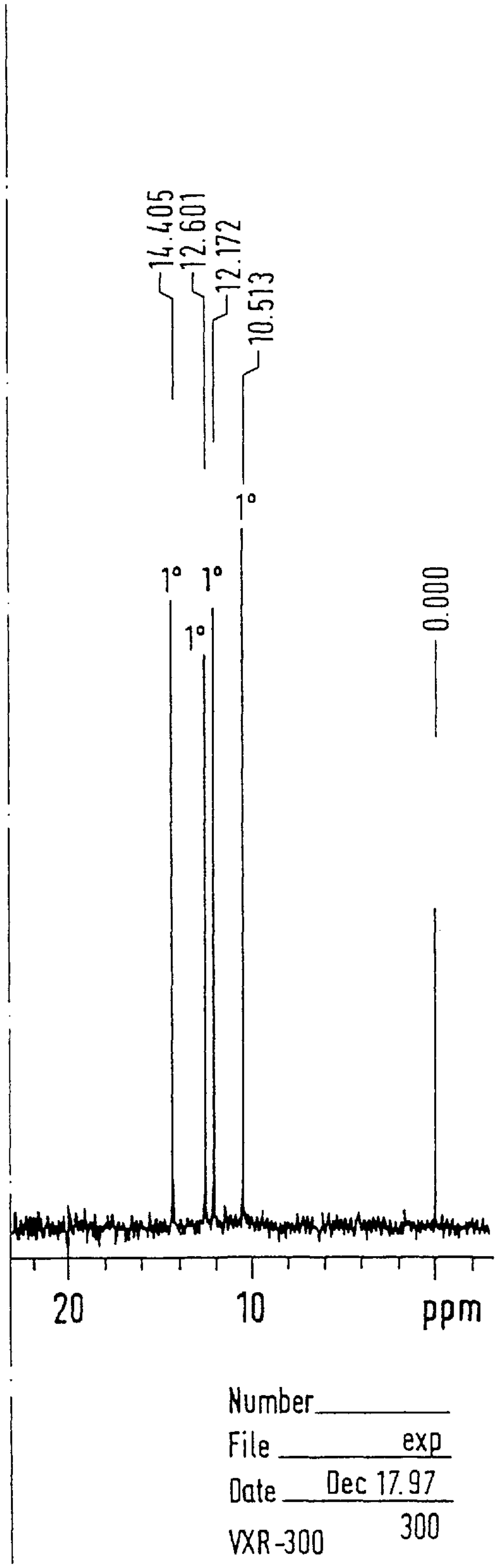

The production of 3-mercapto-2-methyl-pentane-1-ol according to Example 2 is schematically represented in the attached FIG. 2.

Spectroscopic data of the diasteriomeric mixture of 3-mercapto-2-methyl-pentane-1-ol (compound A and B, ratio 49:51):

$^1$H-NMR-Spectrum (300 MHz, $d_B$-benzole, 300 K, TMS as standard): =0.73 (d, 7 Hz, 3 H, 2-Me, B), 0.88 (d, 7 Hz, 3H, 2-Me, A), 0.92 (t, 7 Hz, 3 H, 5-H, A or B), 0.925 (d, 8.5 Hz, 1 H, SH, B), 0.93 (t, 7 Hz, 3 H, 5-h, B or A), 1.15 (d, 8 Hz, 1 H, SH, A), 1.26 (br.m, 1 H, 4-$H_a$, A), 1.38 (m, 2 H, 4-h, B), 1.55 (dqd, 4 Hz, 7 Hz, 15 Hz, 4-$H_b$A), 1.68 (br. sept., ca. 7 Hz, 1 H, 2-H, A), 1.74 (br. m, 1 H, 2-H, B), 2.26 (br. s, 2 H, OH), 2.62 (dddd, 4 Hz, 5.5 Hz, 8 Hz, 10 Hz, 1 H, 3-H, A), 2.89 (ddt, 4 Hz, 6 Hz, 9 Hz, 1 H, 3-H, B), 3.35 (dd, 6 Hz, 10 Hz, 1 H, 1-$H_a$, B), 3.43 (dd, 6 Hz, 10.5 Hz, 1 H, 1-$H_a$, A), 3.47 (dd, 7 Hz, 10.5 Hz, 1 H, 1-$H_b$, A), 3.52 (dd, 8 Hz, 10.5 Hz, 1 H, 1-Hb, B).

$^{13}$C-NMR-Spectrum (75 MHz, $d_e$-benzole, 300 K, TMS as standard): =10.5 (1°, 2-Me, B), 12.2; 12.6 (1°, C-5, A u.B), 14.4 (1°, 2-Me, A), 28.3 (2°, C-4, A), 30.6 (2°, C-4, B), 40.3 (30°, C-2, B), 42.2 (3°, C-2, A), 44.4 (3°, C-3, B), 45.7 (3°, C-3, A), 65.3 (2°, C-1, A), 65.9 (2°, C-1, B).

(1°=prim., 2°=sec., 3°=tert. C-atom); FTIR: Compound A: 3669, 3582, 2971, 2939, 2891, 1464, 1385, 1033; Compound B: 3669, 3583, 2972, 2939, 2889, 1465, 1385, 1035; MS (EI, 70 eV): Compound A: 134 ($M^+$, 21), 100 (42), 83 (18), 75 (51), 74 (100), 71 (60), 55 (48), 47 (30, 45 (27), 41 (96), 31 (33); Compound B: 134 ($M^+$, 21) 100 (42) 83 (22), 75 (52), 74 (100), 71 (60), 55 (50), 47 (31), 45 (31), 41 (97), 31 (34).

In place of the lithium aluminum hydride employed in the second production step according to Example 2 there can be employed diisobutyl aluminum or another suitable reducing agent. The processing or recovery procedures are then, in accordance with the given conditions, adapted in conventional manner to the employed reducing agent.

Figure 7:
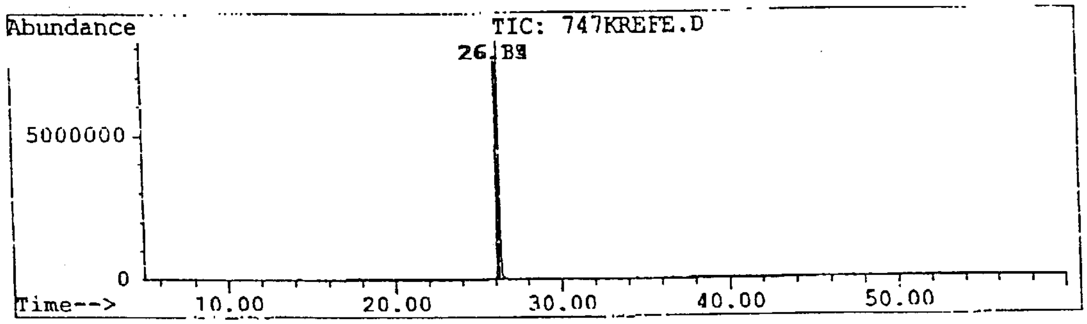
FIG. 7 is an ion chromatogram of the substance of FIGS. 3–6.

The spectroscopic data produced for the inventive substance 3-mercapto-2-methyl-pentane-1-ol correspond to the attached spectra according to FIGS. 3–6; an ion chromatogram was added (FIG. 7).

So much for Examples 1 and 2.

The following Examples 3 and 4 together form a production protocol for the inventive group of the 3-mercapto-2-alkyl-alkane-1-ols using 3-mercapto-2-methyl-pentane-1-ol as example, wherein in the first step (Example 3) 3-mercapto-2-methyl-pentanal is produced.

EXAMPLE 3

Production of 3-mercapto-2-methyl-pentanal

In a 500 ml stirring apparatus with glass inlet tube adjusted to 40° C. 321 g of freshly distilled 2-methyl-2-pentenal, 23 g triethylamine and 1.8 g quinol were dissolved in 600 ml dry tetrahydrofuran. At 40° C. hydrogen sulfide was introduced in a strong stream over approximately 6 hours. The leaving hydrogen sulfide is bonded with sodium hydroxide in a wash bottle connected to the outlet. After the reaction nitrogen is introduced through the reaction solution for 5 minutes, in order to drive off surplus hydrogen sulfide. For isolation of the 3-mercapto-2-methyl-pentanal the reaction solution is washed with water and saturated hydrochloric acid solution, dried over sodium sulfate and freed of solvent in a partial vacuum.

In the GC/MS-Analysis of the retentate one obtains both diasteriomers mercaptoaldehydes in a ratio 1:1 (compare also Example 7).

Remark: The 2-methyl-2-pentanal referred to in Example 3 is commercially available.

The remaining unsaturated aldehydes (2-alkyl-2-alkenal) for syntheses of analogous 3-mercapto-2-alkyl-alkanale according to Example 3, which likewise can be converted but are here not individually named, are either likewise commercially available (for example 2,3-dimethylacrolein) or easily available by known synthesis processes (α,β-Unsaturated Aldehyde by Targeted Aldol Condensation: L. Brandsma, Preparative Polar Organometallic Chemistry 2, p. 145, Springer Publishing House, Heidelberg 1990).

EXAMPLE 4

Production of 3-marcapto-2-methyl-pentanal-1-ol (alternative to synthesis according to example 2)

For the production of the alcohol, 400 ml methanol and 5 ml 50% sodium hydroxide are added to the unrefined reaction solution from the first step according to Example 3. One cools using an ice cooling system to 0° C. and adds in small portions 62.4 g sodium borohydride, so that the internal temperature does not exceed 20° C. After the addition, stirring is continued for 10 hours at room temperature. Subsequently the mixture is reduced at the rotation evaporator at partial vacuum and then diluted with 800 ml methyl-tert-butyl-ether. At 5–10° C. there are first added 400 ml water and then 700 ml 2N-hydrochloric acid. After phase separation the aqueous phase is twice extracted with respectively 200 ml methyl-tert-butyl ether. The combined organic phases are washed once with saturated sodium hydrogen-carbonate solution and dried over sodium sulfate. After extraction of the solvent in partial vacuum, the retentate is subjected to vacuum distillation in a 40 cm-Vigreux column. One obtains 258 g of the product as clear fluid.

EXAMPLE 5

Enantiomer Pure Synthesis 5.1. Synthesis of the (2R, 3S)-and (2S, 3R)-enantiomers of the 3-mercapto-2-methyl-pentane-1-ol.

Figure 5:
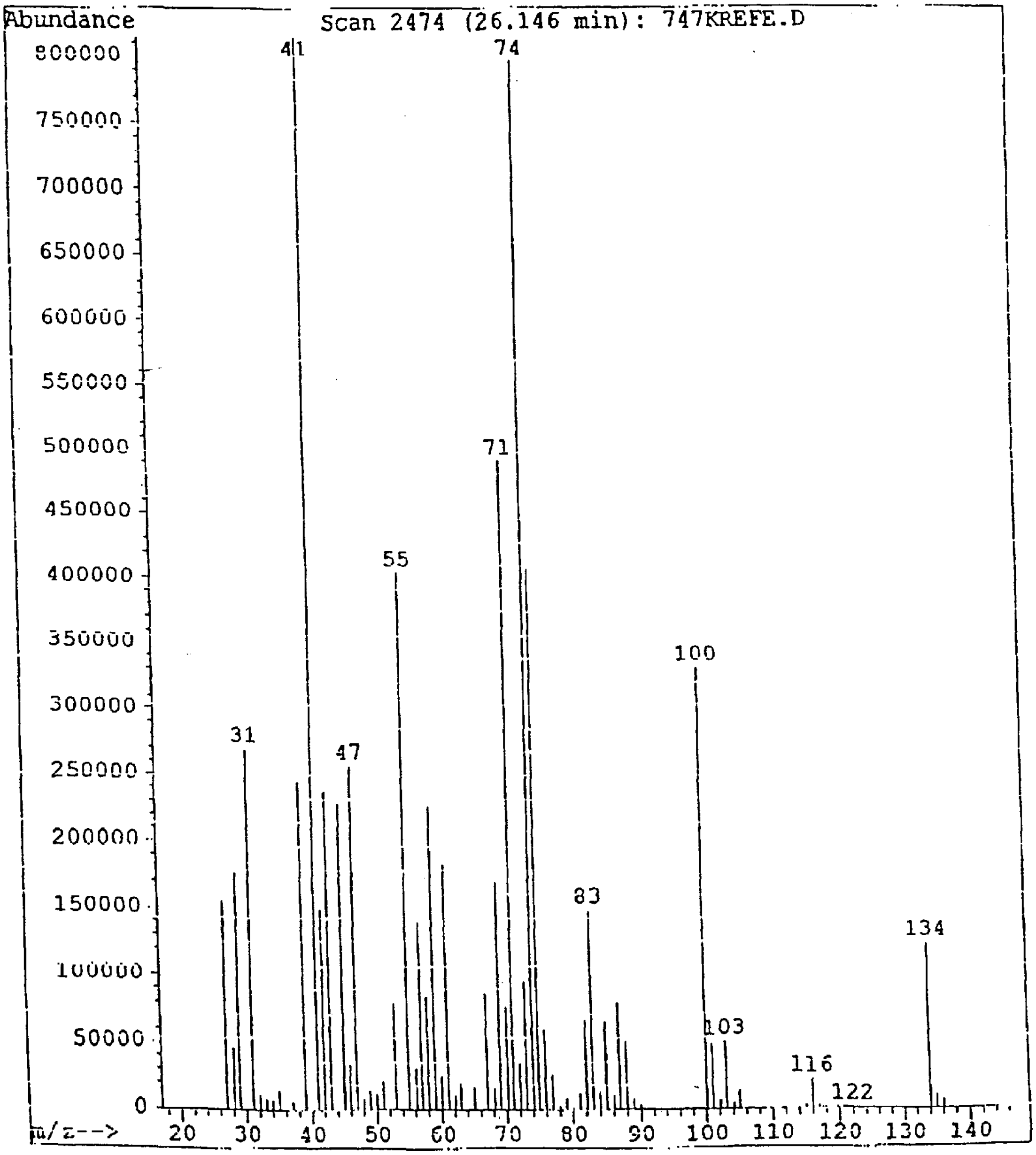
Figure 6:
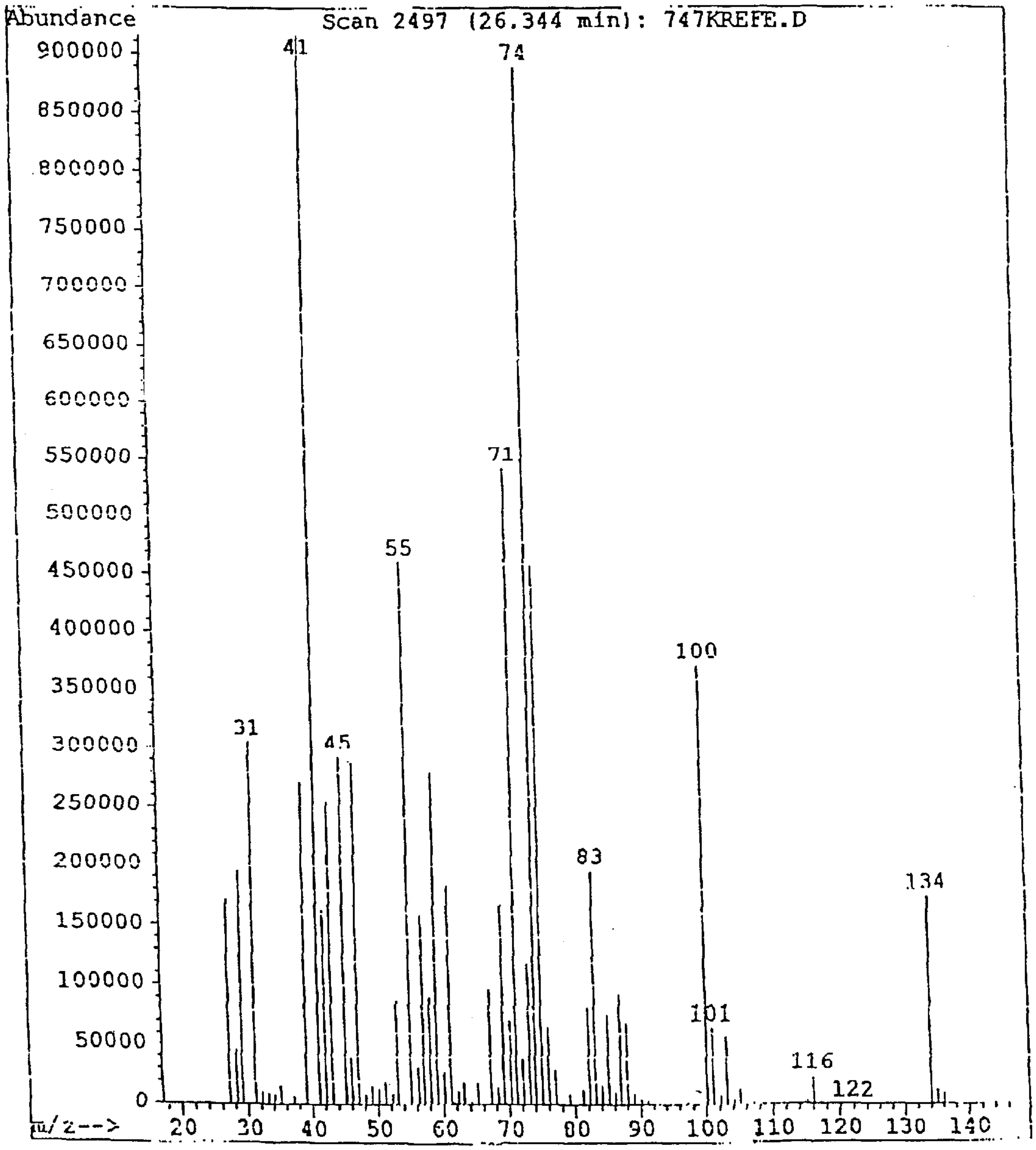
Figure 8:
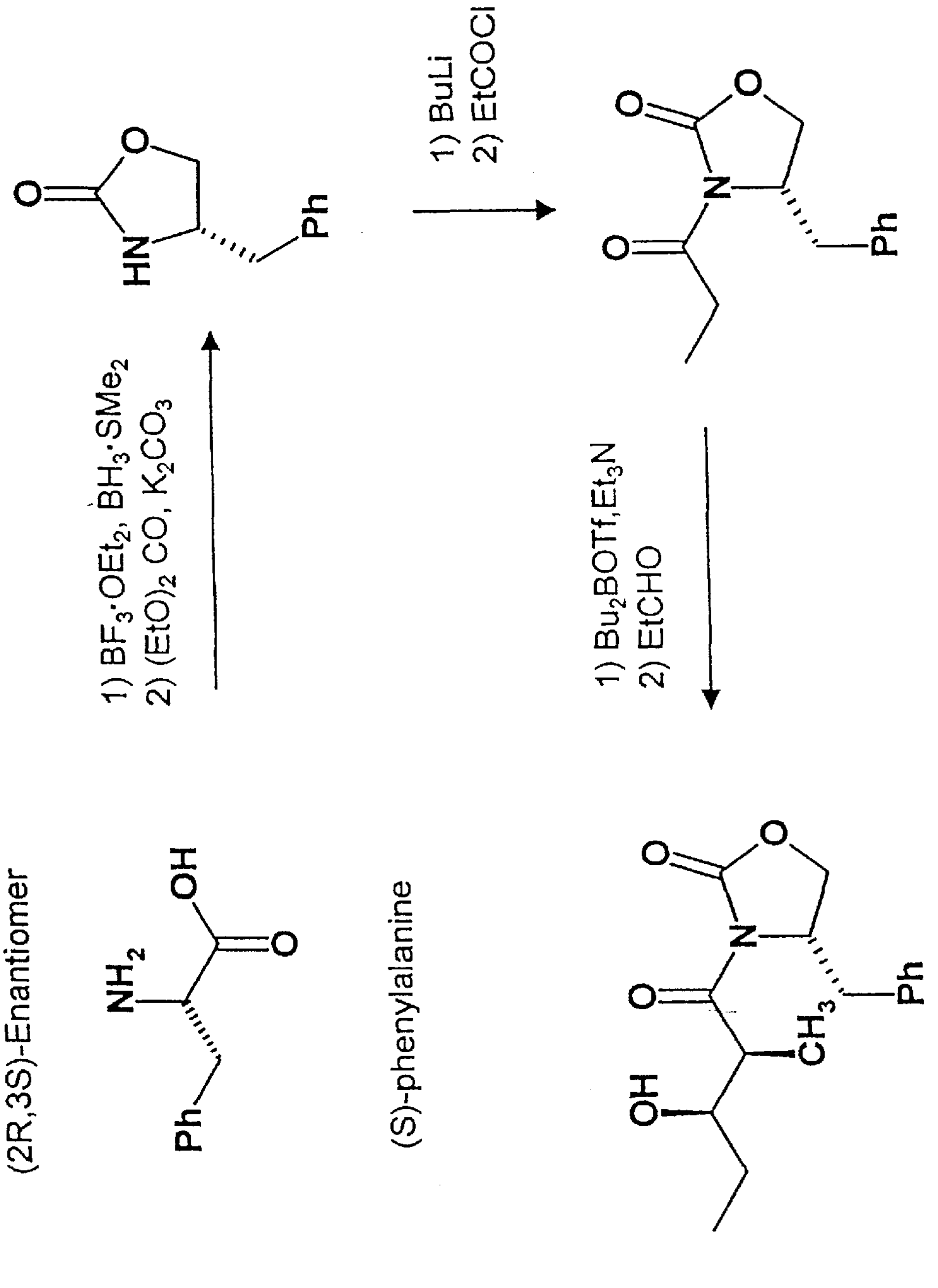
FIGS. 8 and 9 show synthesis of the (2R, 3S)-and (2S, 3R)-enantiomers of the 3-mercapto-2-methyl-pentane-1-ol.
Figure 9:
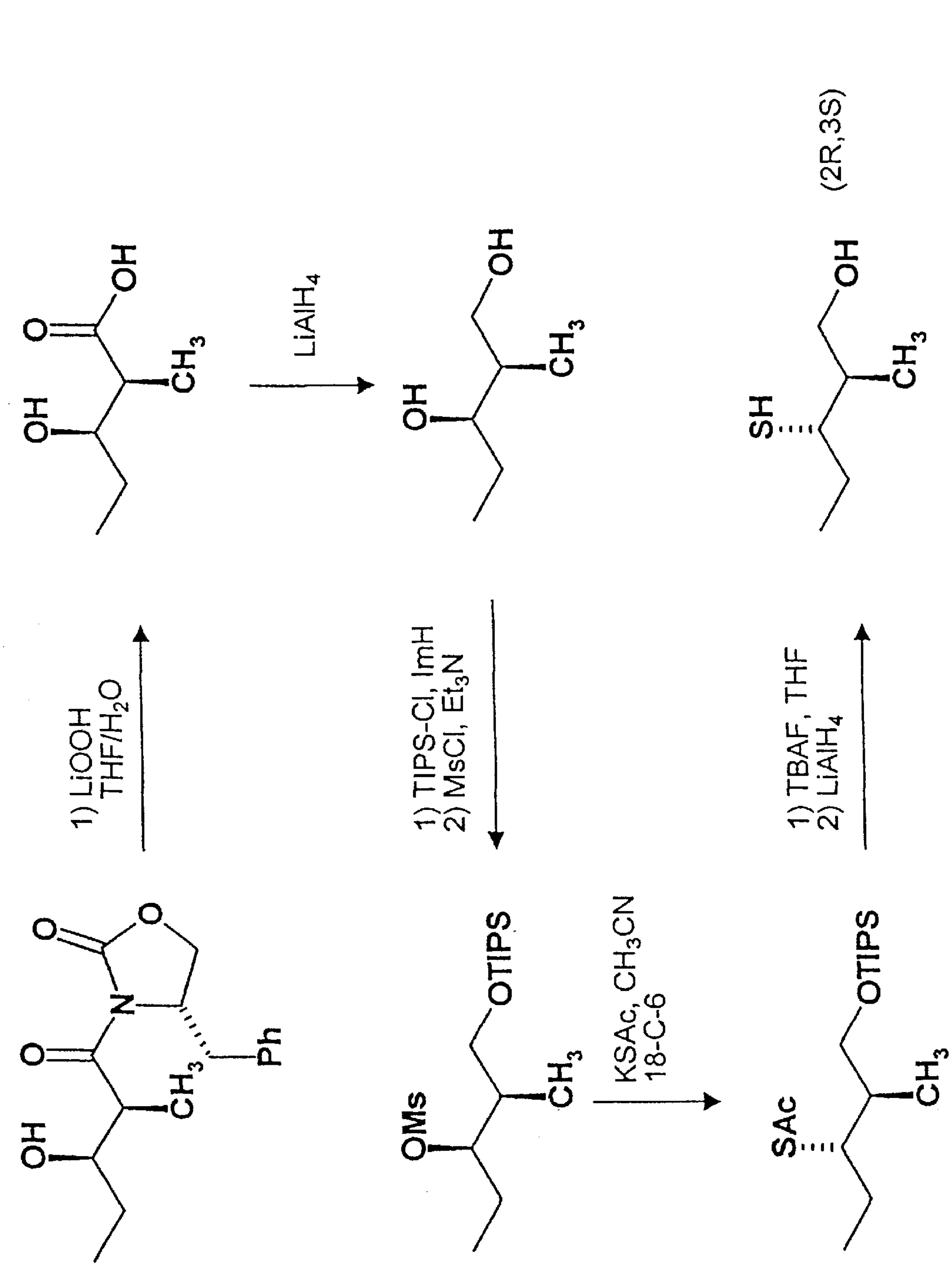

The synthesis schematically represented in the attached FIGS. 8 and 9 begins with the reduction of (S)-phenylalanine by boron(III)flouride-etherate and boron-dimethyl sulfide complexes to phenylalanol which is converted with diethyl carbonate to oxazolidone (Evans' elixir). After acylation of the elixir with butyl lithium and proprionic acid chloride one obtains the N-proprionoloxazolidinone. In the diasteriomeric selective aldol reaction with dibutyl boron(III) flouromethanesulfonate, triethylamine and propionanaldehyde there can be obtained, following recrystalization, the diastereomer pure (S)-3-[(2S,3R)-3-hydroxy-2-methyl-1-oxopentyl]-4-phenylmethyl-1,3-oxazolidin-2-one (FIG. 8). By selective cleavage of the acyl residue of oxazolidone by means of lithium hydroperoxide one obtains therefrom the enantiomer pure β-hydroxy acid, which by lithium aluminum hydride reaction produces the 1,3-diol (J Michael Chong, tetrahedron 1994, 50, 273 and references therein). After selective protection of the primary hydroxyl group as tri-isopropylsilylether one produces by reaction of the secondary hydroxyl group with methane sulfonic acid chloride a volatile or fugitive group, which in the subsequent reaction is substituted with potassium thioacetate, 18-crown 6 (that is, 1, 4, 7, 10, 13, 16-hexaoxacyclooctadecane) in acetonitrile with inversion of the configuration. Deprotection of the primary hydroxyl group and lithium aluminum hydride reduction of the thioester produces the enantiomer pure (2R, 3S)-3-mercapto-2-methyl-pentane-1-ol (FIG. 9).

to FIG. 5 as example for the various enantiomers of the inventive alkanols side by side.

EXAMPLE 6

Sensory Research of Selected Inventive Compounds:

| Chemical Structure | Dose ppm | Odor | Taste | Smell Sensory Threshold Value in ppb (μg/l water) |
|---|---|---|---|---|
| 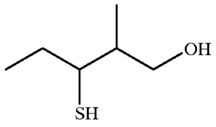 | 0.5 | cooked, meaty, onion, leek, slightly roasted, broth | onion, burned, metallic, sulfurous | 0.63 |
| 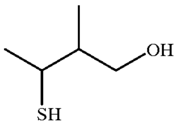 | 1.0 | meaty, sweaty, green | sulfuric, burned rubber, meaty | 0.23 |
| 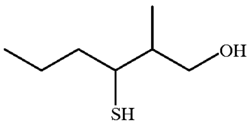 | 1.5 | onion, sulfurous, meaty, rubber, tropical fruit, green | onion, meaty, burned rubber | 0.31 |
| 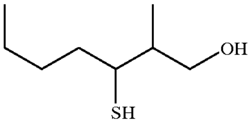 | 3.5 | tropical fruits, grapefruit, cassis, sulfuric, burned, floral, onion | meaty, beefy, roasted, burned | 77 |
| 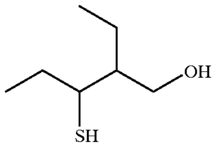 | 0.5 | rubber, onion, tropical fruits | tropical fruits, meaty, esasfoetida, plastic | 1.4 |
| 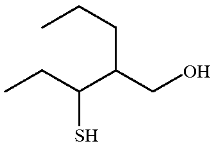 | 2.0 | tropical fruits, sulfuric, fatty-green, meaty, onion | tropical fruits, meaty, onion, rubber, aldehyde like | 10.5 |

The production of the (2S, 3R)-enantiomer occurs accordingly, beginning with (R)-phenylalanine.

Figure 10:
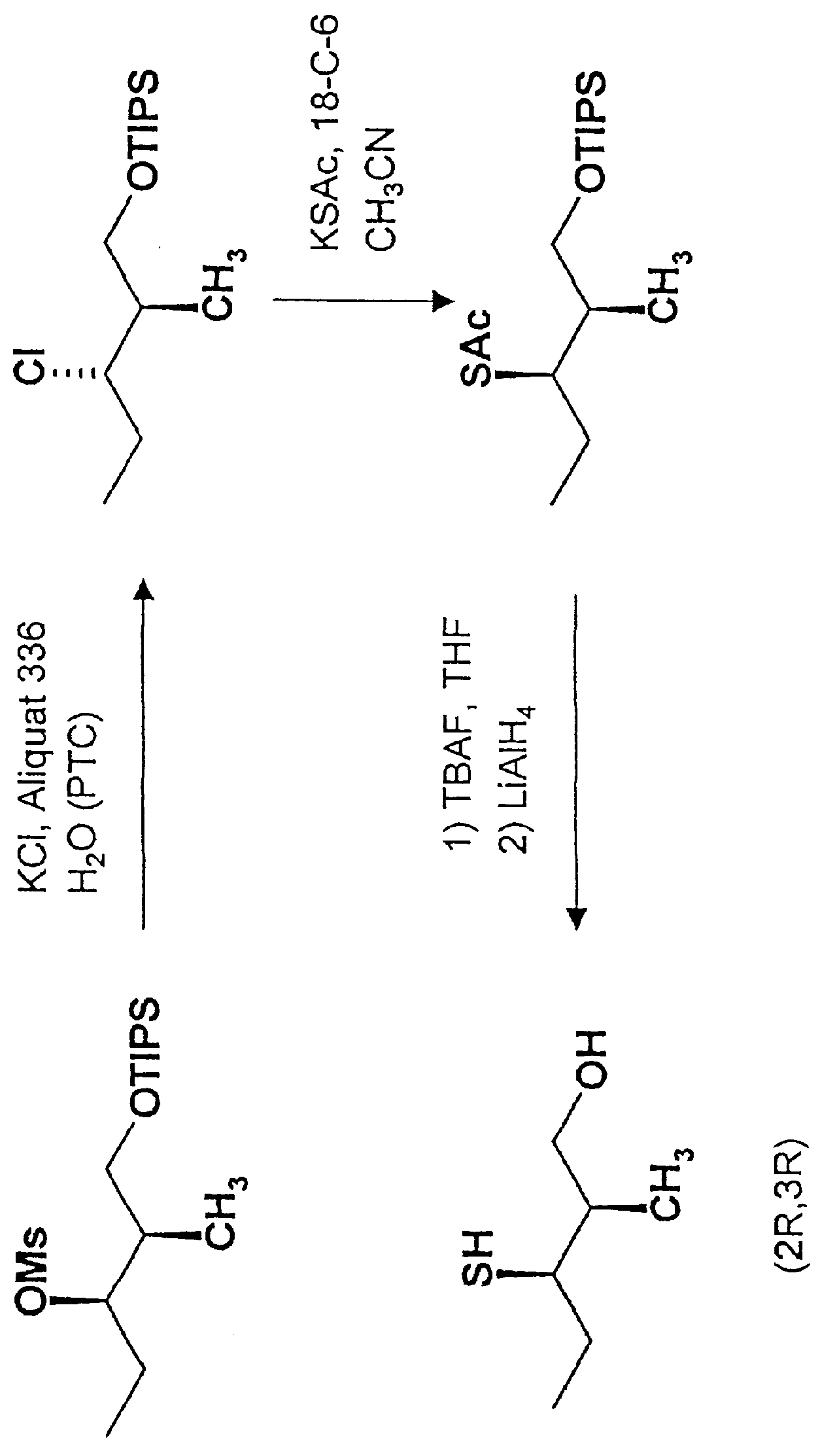
FIG. 10 shows that by conversion of the methane sulfonate one obtains the chloride with reverse configuration, from which the syn-thioacetate can be produced by renewed substitution reactions with potassium thioacetate, which after deprotection and reduction of the thioester produces the corresponding 3-mercapto-2-methyl-pentanols.

5.2. Synthesis of the (2R, 3R) and (2S, 3S)-enantiomer of the 3-mercapto-2-methyl-pentane-1-ol By conversion or reaction of the methane sulfonate from the preceding synthesis (see 5.1) one obtains with potassium chloride, aliquat 336 and water under phase transfer conditions the chloride with reverse configuration. From these there can, by renewed substitution reactions with potassium thioacetate, be produced the syn-thioacetate, which after deprotection and reduction of the thioester produces the corresponding 3-mercapto-2-methyl-pentanols (FIG. 10).

Figure 11:
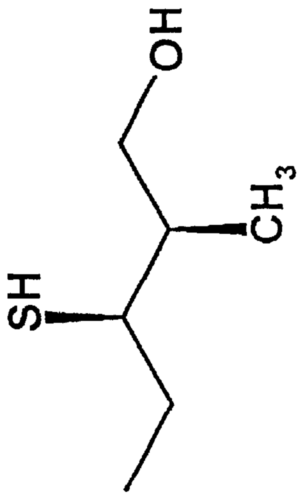
FIG. 11 shows the four synthesized enantiomers of the 3-mercapto-2-methyl-pentanol according to FIG. 5 as examples of the various enantiomers of the inventive alkanols.
Figure 11:
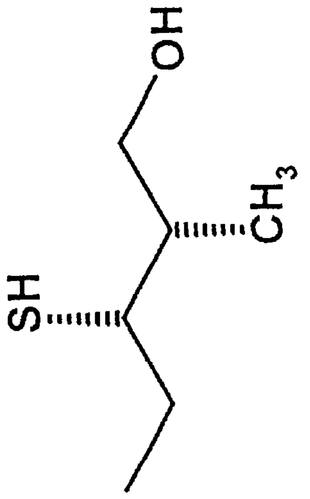
Figure 11:
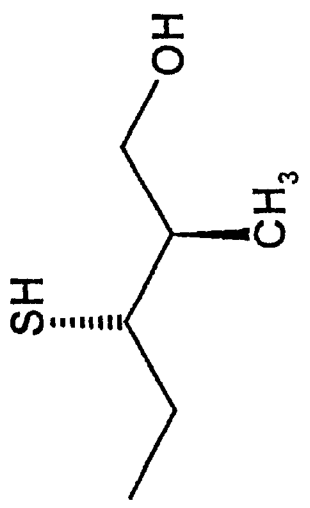
Figure 11:
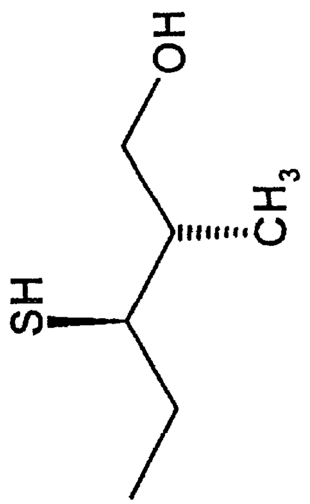

In FIG. 11 there are represented the four synthesized enantiomers of the 3-mercapto-2-methyl-pentanol according For 3(S) -mercapto-2- (R) -methyl-pentane-1-ol the smell sensory thresholds were determined in water and air. Results:

Water: 0.09 ppb (μg/L)

Air: 0.00007–0.00014 ng/L air

The smell threshold in air is among the lowest smell thresholds that have ever been measured for aromatic substances.

EXAMPLE 7

Spectroscopic Data of Further Selected Compounds 3-mercapto-2-methyl-pentanal (see Examples 3 and 4)

FTIR (gas-phase): Diastereomer 1: 2977 (m), 2942 (m), 2890 (m), 2809 (w), 2708 (m), 1739 (s), 1460 (w), 1387 (w), 1305 (w) Diastereomer 2: 2976 (m), 2942 (m), 2890 (m), 2808 (w), 2706 (m), 1740 (s), 1461 (w), 1386 (w), 1307 (w) w=weak m=medium strong s=strong bands.

Figure 12:
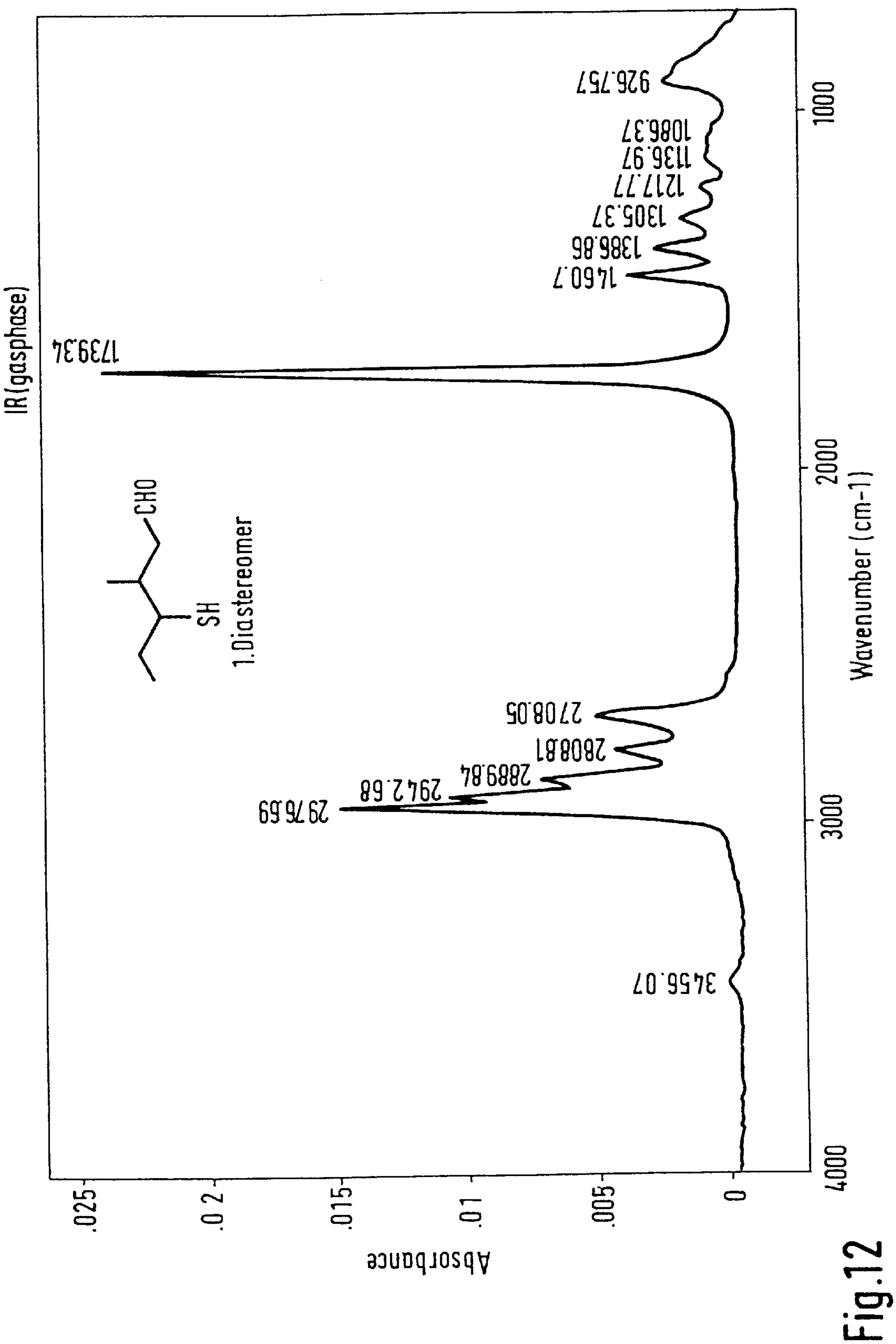
FIGS. 12 and 13 show FLIR spectra of 3-mercapto-2-methyl-pentanal (see Examples 3 and 4).
Figure 13:
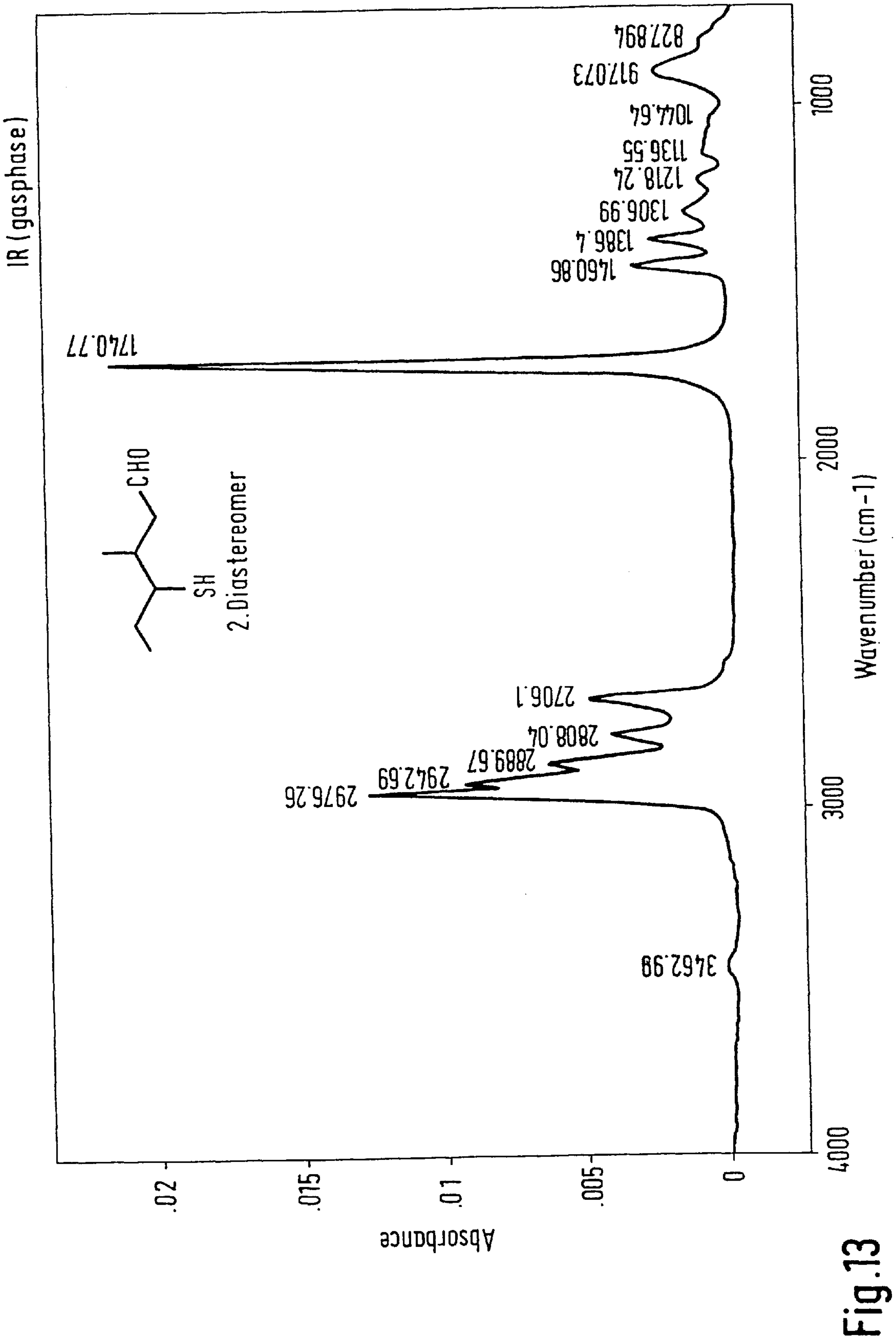

These data correspond to the spectra according to FIGS. 12 and 13.

MS (EI, 70 eV): Diastereomer 1: 132 ($M^+$, 12), 114 (13), 99 (30), 75 (33), 70 (100), 61 (24), 55 (82), 43 (39), 41 (97); Diastereomer 2: 132 ($M^+$, 13), 114 (18); 99 (41), 75 (39), 70 (75), 61 (24), 55 (67), 43 (43), 41 (100).

Figure 14:
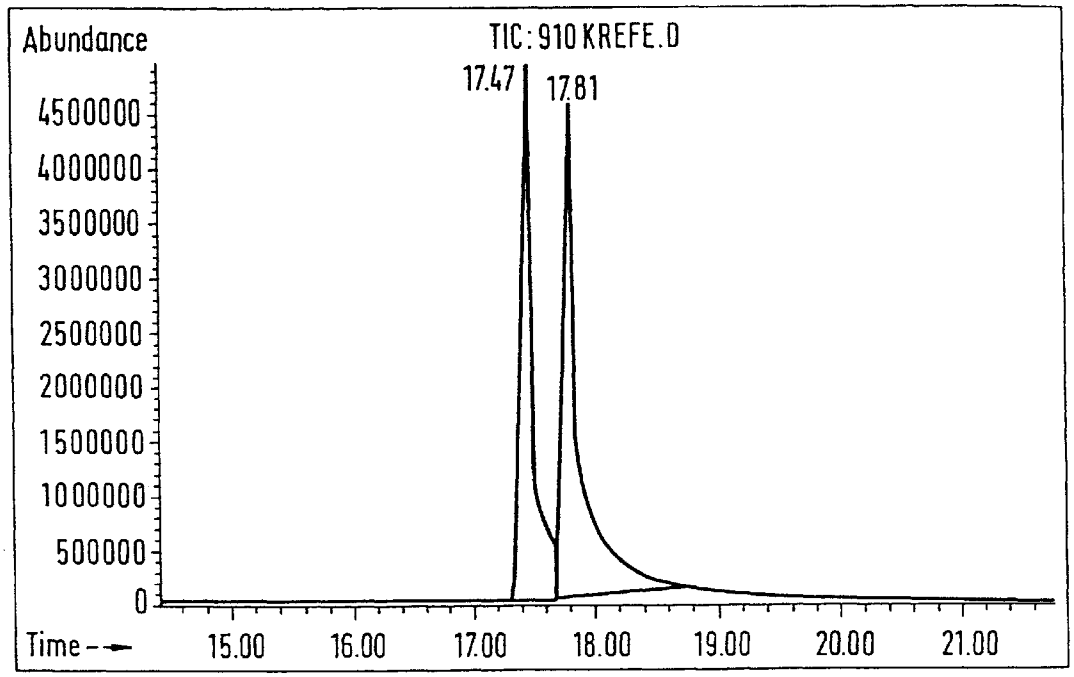
FIGS. 14 and 15 show MS spectra of 3-mercapto-2-methyl-pentanal (see Examples 3 and 4).
Figure 14:
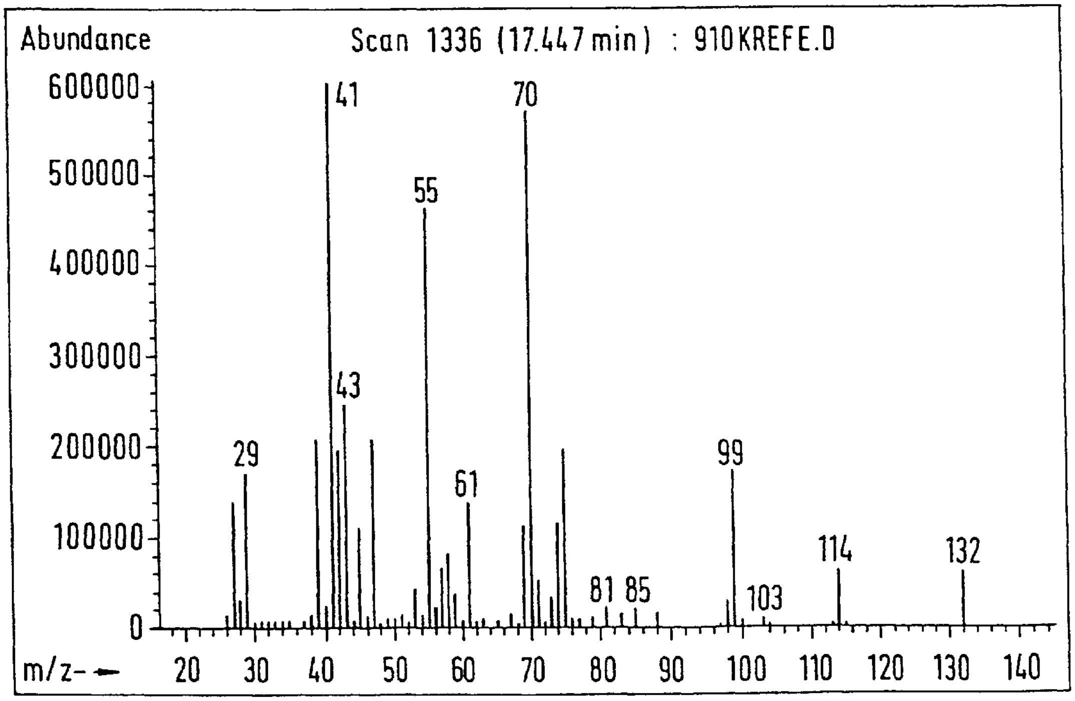
Figure 15:
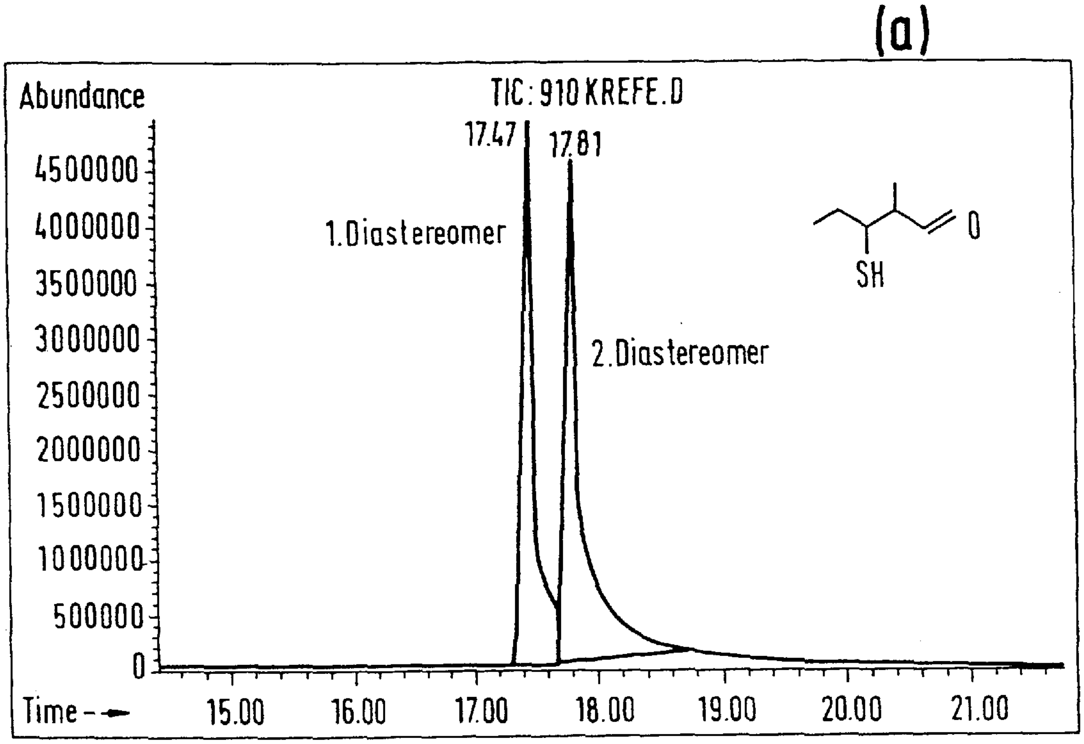
Figure 15:
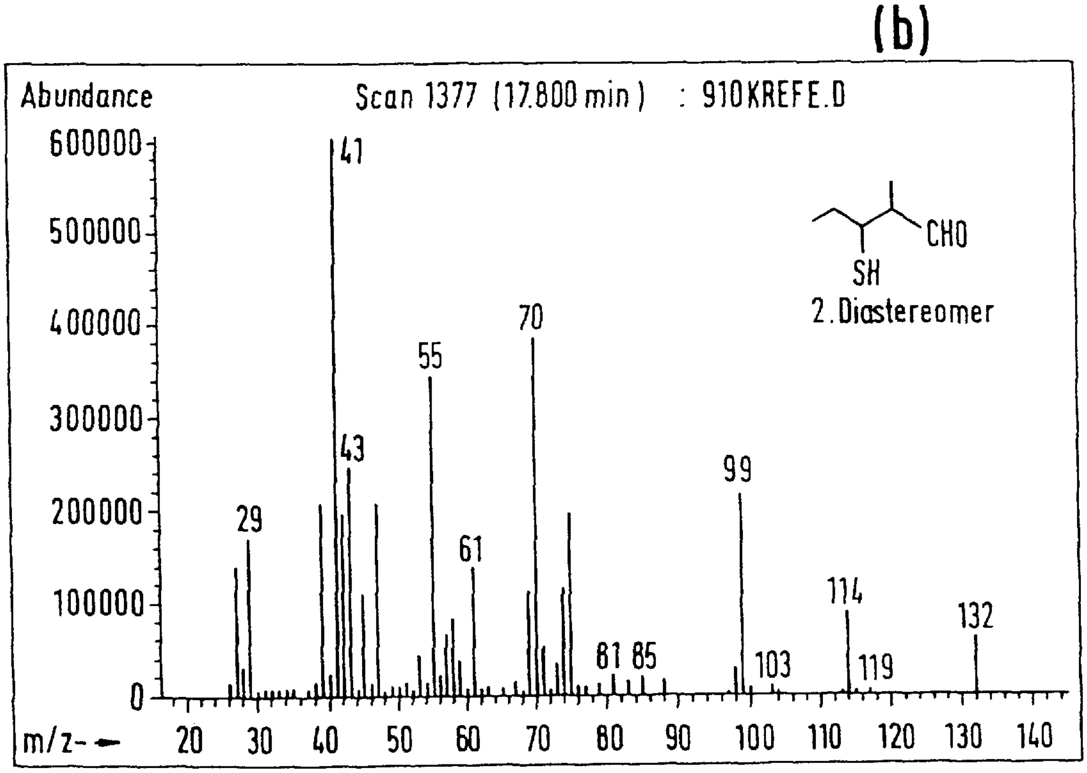

These data correspond to the spectra according to FIGS. 14 and 15

3-mercapto-2-methyl-butane-1-ol

MS (EI, 70 ev): 120 (m+, 31), 102 (4), 86 (84), 71 (77), 69 (38), 61 (89), 60 (100), 55 (58), 45 (67), 41 (69), 31 (42).

3-mercapto-2-methyl-hexane-1-ol

MS (EI, 70 ev): 148 (m+, 11), 130 (1), 114 (21), 97 (10), 88 (37), 71 (37), 55 (100), 47 (23), 41 (37).

3-mercapto-2-methyl-heptane-1-ol

MS (EI, 70 ev): 162 (m+, 10), 128 (18), 102 (17), 97 (11), 87 (34), 71 (49), 69 (100), 60 (62), 55 (60), 41 (58).

2-ethyl-3-mercapto-pentane-1-ol

MS (EI, 70 ev): 148 (m+, 23), 130 (8), 114 (62), 85 (70), 74 (100), 55 (97), 41 (82).

2-propyl-3-mercapto-ientane-1-ol

MS (EI, 70 ev): 162 (m+, 21), 144 (6), 128 (45), 74 (100, 55 (72).

What is claimed is:

1. A 3-mercapto-2-alkyl-alkane-1-ol of the formula A:

(A)

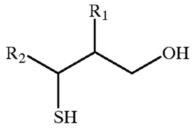

wherein $R_1$=$CH_3$ and $R_2$=$CH_3$, $C_2H_5$, or $C_3H_7$ (n, iso).

2. A process for production of a 3-mercapto-2-alkyl-alkane-1-ol of the general formula A:

(A)

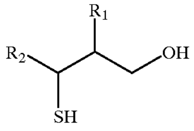

wherein $R_1$=$CH_3$, $C_2H_5$, $C_3H_7$ (n, iso) or $C_4H_9$ (n, iso, tert.) and $R_2$=$CH_3$, $C_2H_5$, $C_3H_7$ (n, iso) or $C_4H_9$ (n, iso, tert.), said process comprising:

providing the 3-acetylthio-2-alkyl-alkanal corresponding to said 3-mercapto-2-alkyl-alkane-1-ol, and converting said 3-acetylthio-2-alkyl-alkanal with a reducing agent.

3. A process according to claim 2, wherein the corresponding 3-mercapto-2-alkyl-alkanal is converted with a reducing agent.

4. A process as in claim 3, wherein said reducing agent is selected from the group consisting of sodium borohydride, lithium aluminum hydride and diisobutyl aluminum hydride.

5. A process for production of a 3-mercapto-2-alkyl-alkane-1-ol of the general formula A:

(A)

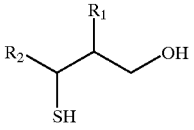

wherein $R_1$=$CH_3$, $C_2H_5$, $C_3H_7$ (n, iso) or $C_{49}$ (n, iso, tert.) and $R_2$=$CH_3$, $C_2H_5$, $C_3H_7$ (n, iso) or $C_4H_9$ (n, iso, tert.), said process comprising:

providing the 3-acetylthio-2-alkyl-alkanal corresponding to said 3-mercapto-2-alkyl-alkane-1-ol, and converting said 3-acetylthio-2-alkyl-alkanal with a reducing agent selected from the group consisting of lithium aluminum hydride and diisobutyl aluminum hydride.

6. Process for production of 3-mercapto-2-methyl-pentane-1-ol, said process comprising:

providing 3-acetylthio-2-methyl-pentanal, and converting said 3-acetylthio-2-methyl-pentanal to 3-mercapto-2-methyl-pentane-1-ol with a reducing agent.

7. A process as in claim 6, wherein said reducing agent is selected from the group consisting of sodium borohydride, lithium aluminum hydride and diisobutyl aluminum hydride.

8. A method of enhancing or imparting fragrance or organoleptic properties, comprising adding to a material a fragrance or organoleptically effective amount of a 3-mercapto-2-alkyl-alkane-1-ol of the formula A:

(A)

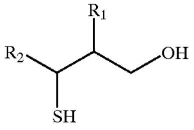

wherein $R_1$=$CH_3$, $C_2H_5$, $C_3H_7$ (n, iso) or $C_4H_9$ (n, iso, tert.) and $R_2$=$CH_3$, $C_2H_5$, $C_3H_7$ (n, iso) or $C_4H_9$ (n, iso, tert.).

9. A method as in claim 8, wherein said 3-mercapto-2-alkyl-alkane-1-ol is 3-mercapto-2-methyl-pentane-1-ol.

10. A fragrance or organoleptic formulation, including at least one 3-mercapto-2-alkyl-alkane-1-ol of the formula A:

(A)

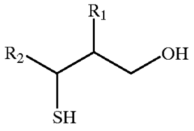

wherein $R_1$=$CH_3$ and $R_2$=$CH_3$, $C_2H_5$, or $C_3H_7$ (n, iso).

11. An organoleptically enhanced foodstuff including a 3-mercapto-2-alkyl-alkane-1-ol of the formula A:

(A)

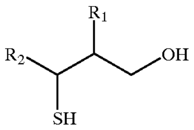

wherein $R_1$=$CH_3$ and $R_2$=$H_3$, $C_2H_5$, or $C_3H_7$ (n, iso).

12. An organoleptically enhanced foodstuff according to claim 11, wherein said 3-mercapto-2-alkyl-alkane-1-ol is 3-mercapto-2-methyl-pentane-1-ol.

13. A process for organoleptically enhancing a foodstuff with a 3-mercapto-2-alkyl-alkane-1-ol of the formula A:

(A)

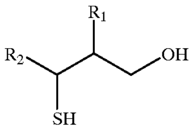

wherein $R_1$=$CH_3$, $C_2H_5$, $C_3H_7$ (n, iso) or $C_4H_9$ (n, iso, tert.) and $R_2$=$CH_3$, $C_2H_5$, $C_3H_7$ (n, iso) or $C_4H_9$ (n, iso, tert.), said process comprising:

adding an ester of the alkanol to the foodstuff, and subjecting the foodstuff with the ester to a process in which the ester is at least partially converted to the alkanol.

14. A process as in claim 13, wherein said ester corresponding to said alkanol is the acetate, propionate, or butyrate of said alkanol.

15. A process as in claim 13, wherein said process in which said ester is at least partially converted to said alcohol is hydrolysis.

16. A process as in claim 13, wherein said process is at least one of cooking, frying and grilling.

* * * * *